Nov. 16, 1965   R. L. VICK   3,217,740

RELIEF VALVE HAVING PARTIAL BALANCING ARRANGEMENT

Filed March 23, 1962

United States Patent Office 3,217,740
Patented Nov. 16, 1965

3,217,740
RELIEF VALVE HAVING PARTIAL BALANCING ARRANGEMENT
Ralph L. Vick, Granada Hills, Calif., assignor to The Bendix Corporation, North Hollywood, Calif., a corporation of Delaware
Filed Mar. 23, 1962, Ser. No. 181,850
5 Claims. (Cl. 137—469)

This invention relates to relief valves that open in response to a predetermined pressure to vent fluid and thereby limit the pressure rise.

An object of the invention is to provide a simple and practicable relief valve that opens widely in response to a pressure only slightly above the pressure required to initiate opening movement.

A more specific object is to provide a relief valve utilizing the flow forces of the fluid passing therethrough to increase the valve opening following initial pressure-induced opening of the valve.

It has been known for many years that conventional relief valves do not open fully until the pressure has risen substantially above that necessary to start the opening. It has also been known that one reason for slow opening is that the flow of fluid through the valve may create forces tending to close it, and that by modifying the valve construction to alter the direction of flow of fluid some improvement in the opening characteristics can be obtained *after* the valve has opened substantially. However, at very low openings little or no improvement was obtained.

I have discovered that this poor operation at low openings of former valves is due to the fact that the prior structures did not utilize the flow forces at the point where they are the greatest when the valve opening is small. This point is of course the variable channel defined by the valving parts such as the poppet and the seat of a poppet type relief valve.

In accordance with the present invention a poppet type relief valve is provided in which the direction of fluid flow *between the poppet and seat* has a component opposite to the direction of opening movement of the movable valve member, which is usually the poppet but may be the seat.

A full understanding of the invention may be had from the following description with reference to the drawing in which.

Figure 1:
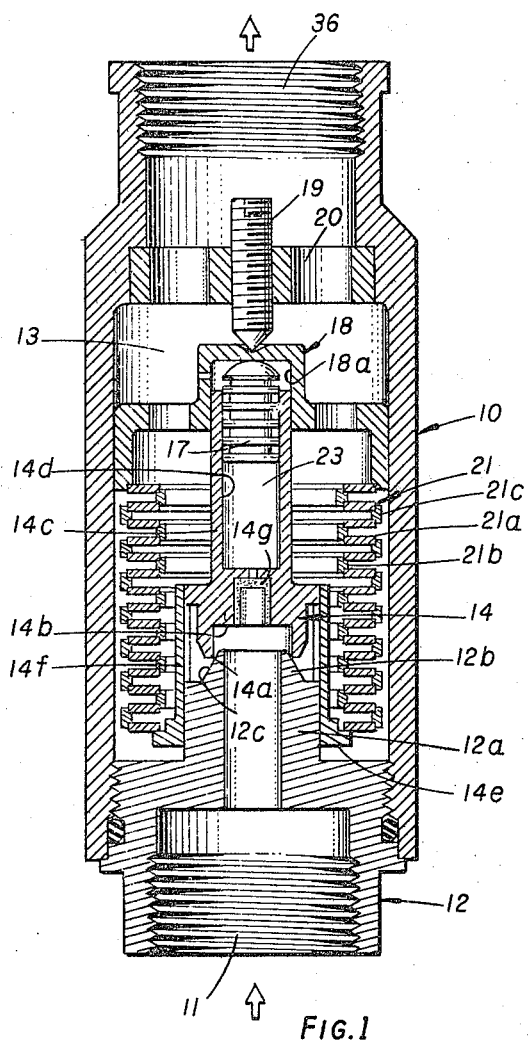
FIG. 1 is a longitudinal sectional view of a relief valve incorporating the invention.

Referring to FIG. 1, the valve therein depicted comprises a generally tubular casing 10 having an outlet passage 36 at its upper end, and having screwed into its internally threaded lower end a valve seat member 12 defining an inlet passage 11 extending therethrough. The upper part of member 12 comprises a reduced intermediate portion 12a having a cylindrical external surface, and an upper end portion 12b having a frustoconical external surface 12c which constitutes the valve seat engageable by a poppet 14.

The poppet 14 has a lower end surface 14b from the periphery of which depends a tubular skirt the lower internal annular edge 14a of which engages the frustoconical seat surface 12c when the valve is closed. The poppet 14 has an elongated upwardly extending tubular portion 14c the inner surface 14d of which slidably engages, in sealing relation, a stationary piston member 17 which is restrained from upward movement by engagement with a spring retainer 18 which is adjustably held against upward movement by an adjusting screw 19 threaded through a spider 20 in the casing 10. The spring retainer 18 is slidably supported by the casing and rests at its lower edge against the upper end of a compression spring 21 the lower end of which engages a spring seat 14e slidable on the outer cylindrical surface of seat element portion 12a and secured to the poppet element 14 by vertical struts 14f. The upper end portion 14c of the poppet element 14 is slidably guided for linear movement by an inner cylindrical surface 18a in the spring retainer 18, and the lower end portion, spring seat 14e is so guided by the seat element portion 12a.

The spring 21 is shown as being of the stacked disk type consisting of a plurality of perforate disks 21a spaced apart by alternate inner rings 21b and outer rings 21c.

Area balance is employed to reduce the spring force required to keep the valve closed at high pressures and permit a large circumferential valve-opening length for high flow potential at low linear seat displacement from the closed position. This and flow force compensation allow use of high spring rates; thus the valve envelope can be reduced to a minimum. Thus the lower end surface 14b of the poppet element has an aperture extending therethrough containing a filter element 14g for communicating the inlet passage 11 with a chamber 23 defined by the hollow poppet portion 14c and the piston 17. The inlet pressure acting downward on the lower end of chamber 23 opposes and therefore neutralizes a substantial portion of the inlet pressure force acting upwardly on the face 14b. The balanced area and connecting orifice also provide a hydraulic dampener for high pressure applications.

In operation, a pressure rise in the inlet passage 11 to a valve sufficient to overcome the closing force of spring 21 cracks the valve (lifts the poppet slightly) permitting fluid from the inlet passage 11 to escape in a high velocity annular jet between the slightly separated contact surfaces 12c and 14a of the seat and poppet elements respectively. An important novel feature of the present invention is that the direction of this high velocity jet is downward and outward, essentially parallel to the slightly separated contact surfaces of the poppet and seat, so that the opposite, upward and inward reactive force resulting from the jet is applied to the poppet in direction tending to open it further. The result is that the range of pressures required to move the poppet element from cracked to fully open positions is substantially reduced.

An important factor of any spring closed relief valve is the spring rate of the spring. Relatively compact springs are desirable but have high spring rates, increasing the pressure variation between cracked and fully open positions respectively. The present invention is particularly useful where both a narrow pressure range of opening and a compact structure are required.

The employment of flow force compensation in the manner described and especially in conjuction with a partially balanced area construction allows use of an extremely high rate, and therefore compact, spring. The valve shown in FIG. 1 would require a helical spring with an insufficient number of active coils to be stable. Therefore, the stacked disk spring is shown, which can be varied in rate by adding or subtracting disks, and is an extremely stable spring. I am speaking of stability in relation to axial loading in opposition to a resultant angularly applied load to the axis. Angular loading results in high friction and poor performance.

Figure 2:
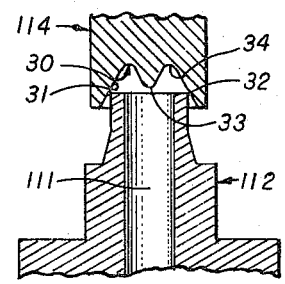
FIGS. 2 and 3 are detailed sectional views showing modifications of FIG. 1.

FIG. 2 shows a modification in the seat and poppet structure that may be made in the valve of FIG. 1. The changes in FIG. 2 over FIG. 1 are:

(a) The poppet element 114 has a continuous lower face 30, eliminating area balance.

(b) The poppet element has a relatively wide bevel face 31, and the seat element 112 has a narrow contact face 32 cooperating with the bevel face 31. This is the reverse arrangement with respect to that shown in FIG. 1.

(c) The poppet element has in its face 30 a central protuberance 33 surrounded by an annular depression 34, for facilitating smooth reversal of direction of flow between the inlet passage 111 and the annular passage between the poppet and seat elements when the valve is open.

Figure 3:
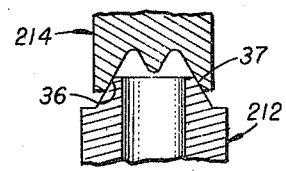

FIG. 3 shows a further modification differing only from that shown in FIGS. 1 and 2 in that both the poppet element 214 and the seat element 212 have relatively wide bevel contact surfaces 36 and 37 respectively. The invention is not limited to any particular width or relative width of the poppet and seat contact surfaces or to the material comprising them, but relates to the shaping and positioning of the poppet and seat elements such that the flow between the *contact faces* of the poppet and seat elements has a directional component opposite to the direction of opening movement of the movable element.

Although for the purpose of explaining the invention a particular embodiment thereof has been shown and described, obvious modifications will occur to a person skilled in the art, and I do not desire to be limited to the exact details shown and described.

I claim:

1. A relief valve comprising:
    a casing defining an inlet passage extending inwardly from the exterior of the casing and defining a valve seat element at the inner end of said passage;
    said casing also defining an outlet passage extending from said seat element to the exterior of the casing;
    a poppet element within said casing;
    means supporting said poppet element for movement between open and closed positions with respect to the seat element to interconnect and disconnect said passages respectively;
    said elements having cooperating annular contact portions contacting each other when said poppet is in its said closed position;
    means resiliently urging said poppet element in the direction to normally close on said seat element and thereby disconnect said passages;
    said poppet element having a fluid-deflecting surface extending laterally from its annular contact portion across said seat element whereby fluid pressure in said inlet passage tends to open said poppet element, and fluid leaving said inlet passage when said poppet element is open impinges on said deflecting surface of said poppet element and is diverted laterally thereby to said annular contact portion and thence flows through the clearance between said contact portions of said elements to said outlet passage;
    said poppet element comprising an outer portion remote from its contact portion defining a cylindrical passage open at its outer end and connected at its inner end by flow-restricting means through said fluid-deflecting surface, said outer portion having a substantial area against which said fluid pressure operates effective to oppose and partially balance the fluid pressure in said inlet passage.

2. A relief valve comprising:
    a casing defining an inlet passage extending inwardly from the exterior of the casing and defining a valve seat element at the inner end of said passage;
    said casing also defining an outlet passage extending from said seat element to the exterior of the casing;
    a poppet element within said casing;
    means supporting said poppet element for movement between open and closed positions with respect to the seat element to interconnect and disconnect said passages respectively;
    said elements having cooperating annular contact portions contacting each other when said poppet is in its said closed position;
    means resiliently urging said poppet element in direction to normally close on said seat element and thereby disconnect said passages;
    said poppet element having a fluid-deflecting surface extending laterally from its annular contact portion across said seat element whereby fluid pressure in said inlet passage tends to open said poppet element, and fluid leaving said inlet passage when said poppet element is open impinges on said deflecting surface of said poppet element and is diverted laterally thereby to said annular contact portion and thence flows through the clearance between said contact portions of said elements to said outlet passage;
    said poppet element comprising an outer portion remote from its said contact portion defining a cylindrical passage open at its outer end and connected at its inner end by flow restricting means through said fluid-deflecting surface;
    and piston means normally stationary with respect to said casing extending into said passage from the open end thereof in sliding sealing relation with said passage whereby the inlet pressure force acting on said poppet element and tending to open it is partially balanced.

3. Apparatus according to claim 2 in which the said contact portions of said elements are so shaped and positioned with respect to each other that relative opening movement produces a flow channel therebetween the direction of which has a component opposite to the direction of opening movement of said poppet element, whereby fluid flow through said channel tends to further open said poppet element.

4. Apparatus according to claim 2 in which said outer portion of said poppet element has an external guide surface, and guide means laterally engaging said casing for lateral support thereby and having an internal guide surface slidably engaging said external guide surface of said poppet element to guide said poppet element for linear movement with respect to said seat element.

5. Apparatus according to claim 4 including an external guide surface on said seat element and guide means on said poppet element extending beyond said annular contact portion of said poppet element and having an internal guide surface slidably engaging said external guide surface on said seat element.

References Cited by the Examiner
UNITED STATES PATENTS

| | | | |
|---|---|---|---|
| 1,667,055 | 4/1928 | Sloan | 137—469 |
| 1,772,107 | 8/1930 | Nelson | 137—469 XR |
| 2,568,026 | 9/1951 | Pigott | 137—469 |
| 2,655,935 | 10/1953 | Kinzbach | 267—1 XR |
| 2,917,072 | 12/1959 | Saville | 137—469 |
| 3,054,420 | 9/1962 | Williams | 137—469 |

ISADOR WEIL, *Primary Examiner.*
MARTIN P. SCHWADRON, *Examiner.*